United States Patent
Kobayashi

(10) Patent No.: US 8,005,311 B2
(45) Date of Patent: Aug. 23, 2011

(54) IMAGE PROCESSING APPARATUS, IMAGE PROCESSING METHOD, AND RECORDING MEDIUM

(75) Inventor: Masaaki Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 944 days.

(21) Appl. No.: 11/944,375

(22) Filed: Nov. 21, 2007

(65) Prior Publication Data

US 2008/0152252 A1 Jun. 26, 2008

(30) Foreign Application Priority Data

Dec. 22, 2006 (JP) ................................. 2006-346193

(51) Int. Cl.
*G06K 9/40* (2006.01)
(52) U.S. Cl. ........ 382/260; 382/274; 382/275; 382/282; 358/3.26; 358/3.27; 358/463
(58) Field of Classification Search .................. 382/260, 382/274, 275, 282; 358/3.26, 3.27, 463
See application file for complete search history.

(56) References Cited

U.S. PATENT DOCUMENTS

| 5,650,829 | A | 7/1997 | Sugimoto et al. |
| 5,808,700 | A | 9/1998 | Sugimoto et al. |
| 6,263,216 | B1 * | 7/2001 | Seydoux et al. ............. 455/564 |
| 6,950,562 | B2 * | 9/2005 | Rouvellou .................... 382/264 |
| 7,006,881 | B1 * | 2/2006 | Hoffberg et al. ................ 700/83 |
| 7,542,614 | B2 * | 6/2009 | Silverstein et al. ........... 382/232 |
| 7,660,806 | B2 * | 2/2010 | Brill et al. ............. 707/999.101 |

FOREIGN PATENT DOCUMENTS

JP 08-298665 A 11/1996

* cited by examiner

*Primary Examiner* — Yosef Kassa
(74) *Attorney, Agent, or Firm* — Canon U.S.A. Inc., I.P. Division

(57) ABSTRACT

An image processing apparatus includes a filter processing unit configured to perform filter processing that emphasizes high-frequency components of an input image, a value limit calculation unit configured to calculate value limits that define a range of pixel values for converting a gradation in the image using a result of the filter processing, a limitation unit configured to limit the filter-processed pixel values based on the value limits, and a conversion unit configured to convert the pixel values so that the image having pixel values limited by the limitation unit is adjusted to a converted gradation of different graduation level than the input image. An image processing method and program are also disclosed.

12 Claims, 6 Drawing Sheets

FIG.5A

| 0  | -k   | 0  |
|----|------|----|
| -k | 1+4k | -k |
| 0  | -k   | 0  |

FIG.5B

| 0  | -4 | 0  |
|----|----|----|
| -4 | 17 | -4 |
| 0  | -4 | 0  |

FIG.6A

| 1001 | 1001 | 1001 | 1001 | 1001 |
|------|------|------|------|------|
| 1001 | 1001 | 1001 | 1001 | 1001 |
| 1001 | 1001 | 1003 | 1001 | 1001 |
| 1001 | 1001 | 1001 | 1001 | 1001 |
| 1001 | 1001 | 1001 | 1001 | 1001 |

FIG.6B

| 250 | 250 | 250 | 250 | 250 |
|-----|-----|-----|-----|-----|
| 250 | 250 | 250 | 250 | 250 |
| 250 | 250 | 250 | 250 | 250 |
| 250 | 250 | 250 | 250 | 250 |
| 250 | 250 | 250 | 250 | 250 |

FIG.6C

| 1001 | 1001 | 1001 | 1001 | 1001 |
|------|------|------|------|------|
| 1001 | 1001 | 993  | 1001 | 1001 |
| 1001 | 993  | 1035 | 993  | 1001 |
| 1001 | 1001 | 993  | 1001 | 1001 |
| 1001 | 1001 | 1001 | 1001 | 1001 |

FIG.6D

| 241 | 241 | 241 | 241 | 241 |
|-----|-----|-----|-----|-----|
| 241 | 241 | 239 | 241 | 241 |
| 241 | 239 | 249 | 239 | 241 |
| 241 | 241 | 239 | 241 | 241 |
| 241 | 241 | 241 | 241 | 241 |

US 8,005,311 B2

IMAGE PROCESSING APPARATUS, IMAGE PROCESSING METHOD, AND RECORDING MEDIUM

BACKGROUND OF THE INVENTION

1. Field of the Invention

The present invention relates to an image processing technique for converting a gradation of an image.

2. Description of the Related Art

Conventionally, for the purpose of speeding up processing of images, a gradation of an image is converted into a low level to reduce processing loads in image processing. In converting an image into a low gradation, lower bits in each pixel of the image are eliminated. Japanese Patent Application Laid-Open No. 8-298665 discusses a method for detecting a motion vector in a moving image using such a technique.

However, in a case of image processing which detects feature quantity of an image such as motion vector detection, if the gradation reduction is performed by deleting lower bits, minute signal components are lost, especially those in a highlight part and a shadow part. Consequently, the feature of the image is significantly degraded and accuracy in the feature quantity detection deteriorates.

SUMMARY OF THE INVENTION

The present invention is directed to converting of an image gradation without losing minute signal components. Further, the present invention is directed to highly accurate feature quantity detection.

According to an aspect of the present invention, an image processing apparatus includes a filter processing unit configured to perform filter processing that emphasizes high-frequency components of an input image, a value limit calculation unit configured to calculate value limits that define a range of pixel values for converting a gradation in the image using a result of the filter processing, a limitation unit configured to limit the filter-processed pixel values based on the value limits, and a conversion unit configured to convert the pixel values so that the image having pixel values limited by the limitation unit is adjusted to a converted gradation of different graduation level than the input image. According to another aspect of the present invention, an image processing method includes performing filter processing that emphasizes high-frequency components of an input image, calculating value limits that define a range of pixel values for converting a gradation of the image using a result of the filter processing, limiting the filter-processed pixel values based on the value limits, and converting the pixel values so that the image having limited pixel values is adjusted to a converted gradation of different graduation level than the input image. According to another aspect of the present invention, a computer-readable storage medium stores a program for instructing a computer to implement the aforementioned method.

According to exemplary embodiments of the present invention, a gradation of an image may be converted to a lower level without losing minute signal components.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5A is a view illustrating a filter kernel according to the first exemplary embodiment of the present invention.

FIG. 5B is a view illustrating a filter kernel generated in step S201 according to the first exemplary embodiment of the present invention.

FIG. 6A is a view illustrating an original image input into the image processing apparatus according to the first exemplary embodiment of the present invention.

FIG. 6B is a view illustrating an image generated with a converted gradation. The gradation is converted by a bit shift which is performed on an original image input into the image processing apparatus according to the first exemplary embodiment of the present invention.

FIG. 6C is a view illustrating an example of an image processed according to steps S201 through S206 of the first exemplary embodiment of the present invention.

FIG. 6D is a view illustrating an example of an image processed according to steps S201 through S207 of the first exemplary embodiment of the present invention.

DETAILED DESCRIPTION OF THE EXEMPLARY EMBODIMENTS

Various exemplary embodiments, features, and aspects of the invention will be described in detail below with reference to the drawings.

First Exemplary Embodiment

Figure 1:
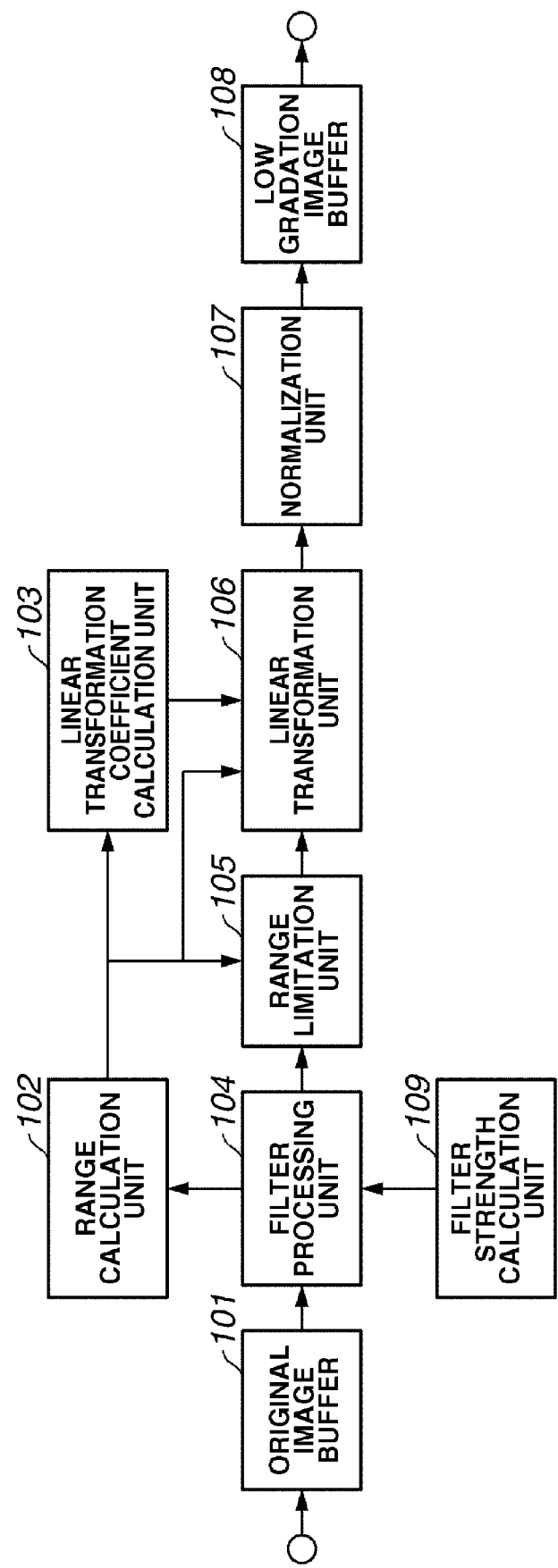
FIG. 1 is a view illustrating essential parts of an image processing apparatus according to a first exemplary embodiment of the present invention.

FIG. 1 is a block diagram illustrating an image processing apparatus according to a first exemplary embodiment of the present invention. The image processing apparatus according to the first exemplary embodiment of the present invention converts an image having an $S_o$ gradation into an image having an $S_r$ gradation where $S_o \geqq S_r$ is satisfied. In the exemplary embodiment, $S_o=1024$, and $S_r=256$. However, the present invention is not limited to these gradations.

In FIG. 1, an original image buffer 101 stores an externally input original image. A filter strength calculation unit 109 calculates strength (k) of a filter, and outputs the calculated value to a filter processing unit 104.

The filter processing unit 104 performs a filter processing on each pixel of the input image using a matrix (filter kernel) of a filtering coefficient, and outputs a result to a range calculation unit 102. The range calculation unit 102 calculates an upper range limit (max_level) and a lower range limit (min_level) based on the pixel values processed in the filter processing unit 104. The range calculation unit 102 outputs the upper range limit and the lower range limit to a linear transformation coefficient calculation unit 103 and a range limitation unit 105. The range calculation unit 102 also outputs the lower range limit to a linear transformation unit 106. The linear transformation coefficient calculation unit 103 calculates a linear transformation coefficient ($K_R$) from the value limits (the upper range limit and the lower range limit) calculated in the range calculation unit 102, and outputs the calculated value to the linear transformation unit 106. The range limitation unit 105 limits the pixel values which are filter-processed in the filter processing unit 104, using the value limits calculated in the range calculation unit 102, and outputs the pixel values to the linear transformation unit 106. The linear transformation unit 106 performs a linear conversion on the limited pixel values using the linear transformation coefficient ($K_R$) and the lower range limit (min_level), and outputs linear transformation values to a normalization unit 107. The normalization unit 107 normalizes the linear transformation values and outputs the values to a low gradation image buffer 108.

Figure 2:
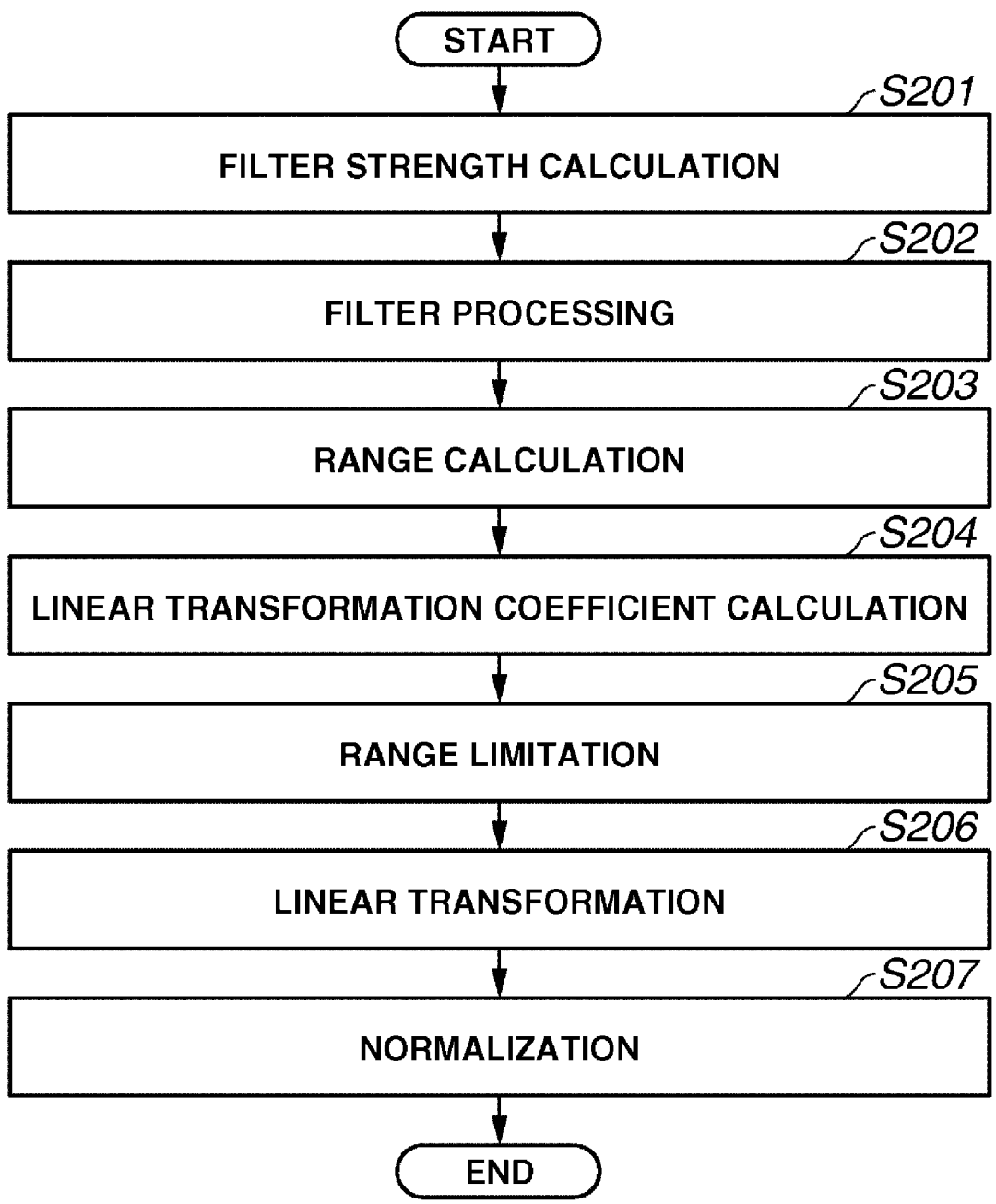
FIG. 2 is a flowchart illustrating an image processing procedure according to the first exemplary embodiment of the present invention.

FIG. 2 is a flowchart illustrating a gradation conversion process performed by the image processing apparatus according to the first exemplary embodiment of the present invention.

In step S201, the filter strength calculation unit 109 calculates a filter strength (k) according to an equation (1). For example, a matrix (filter kernel) of a filtering coefficient shown in FIG. 5A is generated using an equation (1).

$$k = S_o / S_r \quad (1)$$

In the exemplary embodiment, since $S_o$=1024, and $S_r$=256, the filter strength becomes k=4 according to equation (1). In this case, the filter kernel in FIG. 5A can be represented as a filter kernel shown in FIG. 5B. In the exemplary embodiment, the filter kernel of a 3×3 format as shown in FIG. 5B is employed. However, the present invention is not limited to the above format.

Any filter that emphasizes high-frequency components or mid-to-high frequency components of an image can be used in the filter processing step. For example, a high-pass filter or a Gaussian filter can be used.

In step S202, the filter processing unit 104 performs filter processing on each pixel of an original image stored in the original image buffer 101 using the filter kernel generated in step S201, and calculates pixel values ($I_H$(x, y)). The values (x, y) in this step represent coordinates of the image, and the processing is performed on all pixels.

In step S203, a first statistical population is determined. The first statistical population includes each pixel value calculated in step S202 that exceeds So. The range calculation unit 102 calculates an upper range limit (max_level) by obtaining an average value from the statistical population. Further, a second statistical population is determined. The second statistical population includes each pixel value calculated in step S202 that falls below zero (0). The range calculation unit 102 calculates a lower range limit (min_level) by obtaining an average value from the second statistical population. The range calculation unit 102 calculates (1) an average value from a first statistical population as an upper range limit (max_level). The first statistical population includes each pixel value of an image calculated in step S202 that exceeds S0. The range calculation unit 102 calculates also (2) an average value from a second statistical population as a lower range limit (min_level). The second statistical population includes each pixel value of an image calculated in step S202 that falls below zero (0).

In step S204, the linear transformation coefficient calculation unit 103 applies an equation (2) to calculate the linear transformation coefficient ($K_R$) based on the value limits (the upper range limit and the lower range limit) calculated in the range calculation unit 102.

$$K_R = \frac{1}{\text{max\_level} - \text{min\_level}} \quad (2)$$

For example, if the filter processing performed on the entire image using the filter kernel of FIG. 5B calculates that the max_level is 1040 and that the min_level is −60, then the linear transformation coefficient ($K_R$) becomes $K_R$=9.0909× $10^{-4}$ according to the above equation (2).

In step S205, the range limitation unit 105 limits the pixel values ($I_H$(x, y)) calculated by the filter processing unit 104. In particular, the range limitation unit 105 applies an equation (3) to calculate limited pixel values ($I_R$(x, y))

$$I_R(x, y) = \text{Max}(\text{min\_level}, \text{Min}(\text{max\_level}, I_H(x,y))) \quad (3)$$

In step S206, the linear transformation unit 106 performs a linear transformation on the limited pixel values ($I_R$(x, y)) using an equation (4) based on the linear transformation coefficient ($K_R$) calculated in the linear transformation coefficient calculation unit 103 and the lower range limit (min_level) calculated in the range calculation unit 102 to calculate linear transformation values ($I_L$(x, y))

$$I_L(x, y) = K_R(I_R(x, y) - \text{min\_level}) \quad (4)$$

In step S207, the normalization unit 107 applies an equation (5) to perform a normalization of the linear transformation values ($I_L$(x, y)) calculated in the linear transformation unit 106.

$$I_O(x, y) = \text{Int}(I_L(x, y) \times (S_r - 1)) \quad (5)$$

The normalization unit 107 outputs the calculated values as pixel values ($I_O$(x, y)) of a gradation-converted image to the low gradation image buffer 108.

It is to be noted that the processing order of each step is not limited to the above-described order, but can be performed in any order.

Hereinafter, examples of images converted in the above-described steps will be described referring to FIGS. 6A to 6D. Grids in the drawings represent pixels. An original image that has pixel values shown in FIG. 6A is converted into, for example, an image that has pixel values shown in FIG. 6C according to processing performed in steps S201 through S206. Then, respective pixels in FIG. 6C are converted into pixel values shown in FIG. 6D according to the processing performed in step S207.

FIG. 6B illustrates an image having gradation converted by two-bit left shift which is a simple process of the gradation conversion of the image in which minute signal components are lost. The image shown in FIG. 6D, by comparison, sufficiently retains minute signal components. According to the processing, for example, when gradation conversion is performed on an image that includes a cloud floating in the blue sky, minute signal components included in the image of the cloud are retained according to the present invention.

Accordingly, in the gradation conversion processing according to the first exemplary embodiment of the present invention, the gradation can be converted without losing minute signal components of an image. Moreover, the gradation conversion processing according to the first exemplary embodiment is also effective at reducing processing load because the processing typically consumes less memory capacity than conventional methods.

In the first exemplary embodiment, in step S203, a respective average value is used as the representative in the statistical analysis processing for determining the upper limit and lower range limit. However, a median value, maximal value, or minimum value can also be used for the representative. Further, if the gradation of the original image and the gradation of the output image are similar, the filter strength calculation unit 109 can maintain a fixed value. While each unit performs processing on each image, the processing can also be performed on each pixel.

Further, the filter processing unit 104 and the filter strength calculation unit 109 have an independent configuration respectively. However, it is also possible to have a single processing unit that can perform the functions of both units.

Similarly, the functions of the range calculation unit 102 and the range limitation unit 105 can be performed in a single processing unit. Moreover, the functions of the linear transformation coefficient calculation unit 103 and the linear transformation unit 106 can be performed in a single processing unit.

Further, the filter strength calculation unit 109, the range calculation unit 102, and the linear transformation coefficient calculation unit 103 can be implemented, for example, as one or two processing units.

Second Exemplary Embodiment

Figure 3:
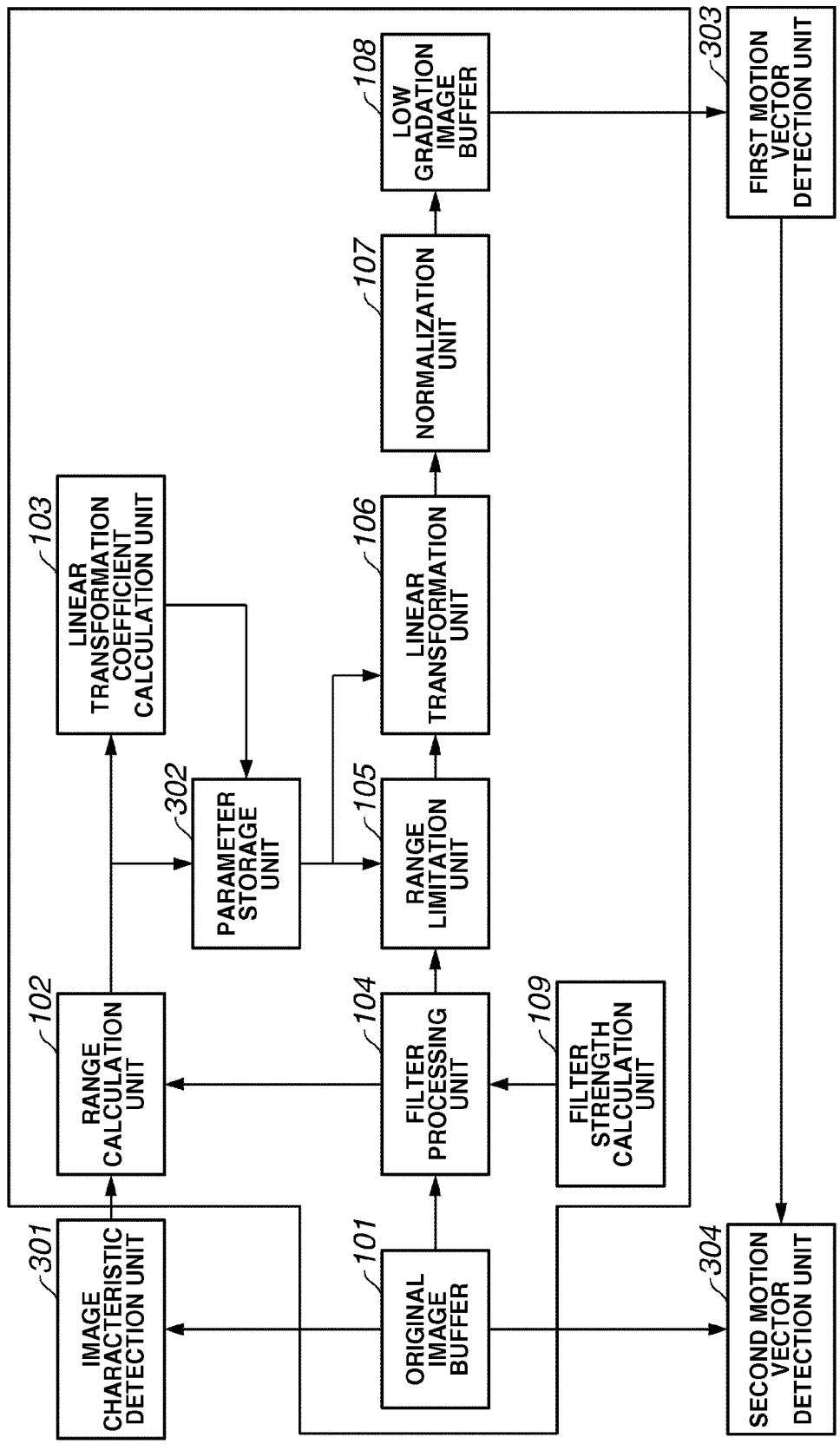
FIG. 3 is a view illustrating an image processing apparatus according to a second exemplary embodiment of the present invention.

FIG. 3 is a block diagram illustrating an image processing apparatus according to a second exemplary embodiment of the present invention. The image processing apparatus according to the second exemplary embodiment converts an image having a $S_o$ gradation into an image having a $S_r$ gradation. Further, the image processing apparatus detects a motion vector from the image. In the configuration in FIG. 3, in addition to the units 101 through 108 of the first exemplary embodiment illustrated in FIG. 1, an image characteristic detection unit 301, a parameter storing unit 302, a first motion vector detection unit 303, and a second motion vector detection unit 304 are added. Except as noted below, units 101 through 108 in the second exemplary embodiment function in the same manner as those in the first exemplary embodiment illustrated in FIG. 1.

In FIG. 3, the image characteristic detection unit 301 detects a scene change based on original images input into the original image buffer 101. The parameter storing unit 302 retains an upper range limit (max_level), a lower range limit (min_level), and a linear transformation coefficient ($K_R$) when the scene change is detected in the image characteristic detection unit 301. The first motion vector detection unit 303 detects a motion vector based on gradation-converted images that are in a back-and-forth relationship in timing with each other and that are stored in the low gradation image buffer 108. The second motion vector detection unit 304 performs a motion vector detection using the motion vector calculated in the first motion vector detection unit 303 and an image in the original image buffer 101. The motion vector calculated in the first motion vector detection unit 303 serves as a base point for the motion vector detection.

Figure 4:
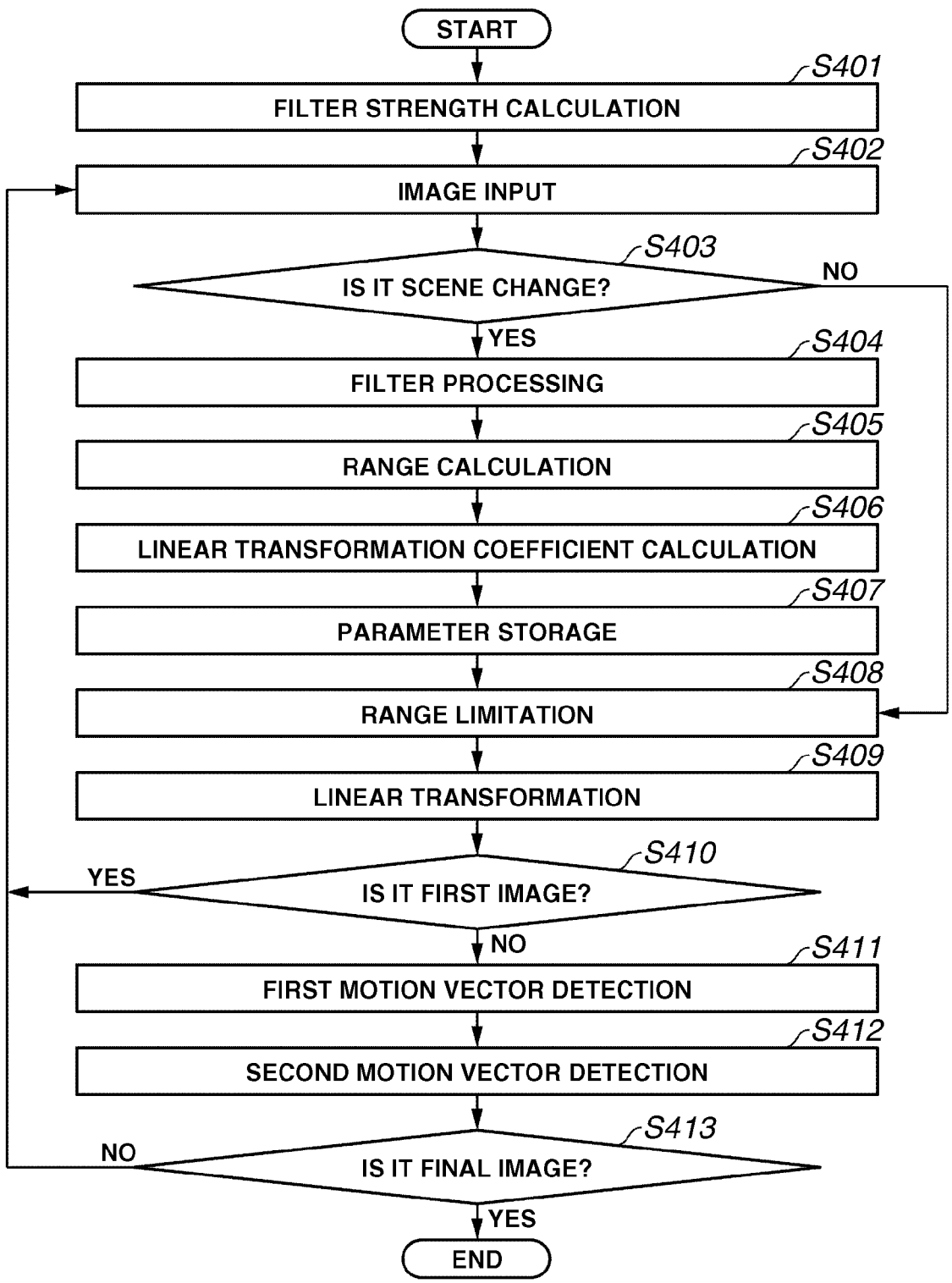
FIG. 4 is a flowchart illustrating an image processing procedure according to the second exemplary embodiment of the present invention.

FIG. 4 is a flowchart illustrating gradation conversion processing according to the second exemplary embodiment of the present invention.

In step S401, the filter strength calculation unit 109 calculates a filter strength (k) according to the equation (1) and generates a filter kernel. The processing performed in this step is similar to step S201 according to the first exemplary embodiment of the present invention.

In step S402, sequential images are input into the original image buffer 101.

In step S403, the image characteristic detection unit 301 detects whether a scene change occurs based on the original images input into the original image buffer 101. If a scene change is detected, processing continues in step S404, but if a scene change is not detected, then processing continues in step S408.

In step S404, in the same manner as step S202 according to the first exemplary embodiment, the filter processing unit 104 performs filter processing on the input original image and calculates its pixel values ($I_H$ (x, y)).

If a scene change is detected in step S403, or if the input image is a first image in step S402, then in step S405, in the same manner as step S203 according to the first exemplary embodiment, the range calculation unit 102 calculates an upper range limit and a lower range limit.

In step S406, similar to step S204 according to the first exemplary embodiment, the linear transformation coefficient calculation unit 103 calculates a linear transformation coefficient ($K_R$) based on the value limits using the equation (2).

In step S407, the range calculation unit 102 and the linear transformation coefficient calculation unit 103 respectively instruct the parameter storing unit 302 to store the calculated upper range limit, lower range limit, and linear transformation coefficient.

In step S408, the range limitation unit 105 reads the upper range limit and the lower range limit from the parameter storing unit 302, and in the same manner as step S205 according to the first exemplary embodiment, calculates the limited pixel values ($I_R$ (x, y)).

In step S409, the linear transformation unit 106 reads the linear transformation coefficient and the lower range limit from the parameter storing unit 302, and in the same manner as step S206 according to the first exemplary embodiment, calculates the linear transformation values ($I_L$ (x, y)).

In step S410, it is determined whether the image processed in the prior step S409 is the first image. If it is determined that the image is the first image, the process returns to step S402, and a next image is processed. If it is determined that the image is not the first image, the process proceeds to step S411.

In step S411, the first motion vector detection unit 303 detects a motion vector of integer pixel accuracy using two gradation-converted images stored in the low gradation image buffer 108.

In step S412, the second motion vector detection unit 304 calculates a motion vector of fractional pixel accuracy based on the motion vector of integer pixel accuracy calculated in step S411 using the original image stored in the original image buffer 101. Processing continues in step S413, wherein it is determined whether the processed image is a final image to be processed, and if it is not the final image, then processing continues in step S402 with a next image, whereas if it is the final image, then processing ends.

It is noted that the processing order of the each step is not limited to the above-described, but can be performed in any order as long as the processing is feasible.

As described above, the detection of the motion vector is performed with integer pixel accuracy using the gradation-converted image generated in the gradation conversion processing according to the second exemplary embodiment, so that an accurate and hi-speed motion vector detection is realized. Further, the detection of the motion vector is performed with fractional pixel accuracy using the original image. Accordingly, accuracy is obtainable close to accuracy of the motion vector detection performed with integer pixel accuracy and fractional pixel accuracy in an actual gradation.

It is noted that while the image characteristic detection unit 301 according to the second exemplary embodiment detects a scene change, the image characteristic detection unit 301 can also detect fade-in and fade-out of an input image. Moreover, in a compression-coded image, the image characteristic detection unit 301 can detect an intra-picture encoded image. Further, the image characteristic detection unit 301 can be replaced by an input image counter that periodically recalculates the upper range limit, the lower range limit, and the linear transformation coefficient.

Other Exemplary Embodiments

An aspect of the present invention can be applied to a part of a system including a plurality of devices or a part of an apparatus consisting of a single device.

Further, the present invention is not limited to the apparatuses and methods that realize the above-described exemplary embodiments of the present invention.

For example, the present invention can be implemented by supplying a program code of software implementing the functions of the above-described exemplary embodiments to a computer (CPU or MPU) in the system or the apparatus. Then, the computer in the system or the apparatus achieves an aspect of the present invention by executing the provided program code to operate the above various devices.

Accordingly, the program code itself installed on the computer realizes one or more of the exemplary embodiments of the present invention. That is, the computer program code itself, and the units for supplying the program code to the computer, for example, a storage medium storing the program code constitute the present invention.

As the storage medium for storing such program code, for example, a floppy® disk, a hard disk, an optical disk, and a magneto-optical disk can be employed. Further, a compact disk read-only memory (CD-ROM), a Digital Versatile Disc (DVD), a magnetic tape, a nonvolatile memory card, and a ROM can be employed.

Further, the present invention is not limited to the case where the functions according to the exemplary embodiments are realized by controlling the various devices only according to the program code. For example, in another aspect of an exemplary embodiment of the present invention, the program code cooperates with an operating system (OS) or application software running on the computer to implement and execute the function of one or more of the above-described embodiments.

Moreover, in still another aspect of an exemplary embodiment of the present invention, based on an instruction according to the program code stored in a memory which is provided in a function enhancing board provided in the computer, a central processing unit (CPU) or the like provided in the function enhancing board executes a part or the whole of the actual processing, and thus, the function of one or more of the above described embodiments is realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-346193 filed on Dec. 22, 2006, which is hereby incorporated by reference herein in its entirety.

What is claimed:

1. An image processing apparatus comprising:
a filter processing unit configured to perform filter processing that emphasizes high-frequency components of an input image;
a value limit calculation unit configured to calculate value limits that define a range of pixel values for converting a gradation of the image using a result of the filter processing;
a limitation unit configured to limit the filter-processed pixel values based on the value limits; and
a conversion unit configured to convert the pixel values so that the image having pixel values limited by the limitation unit is adjusted to a converted gradation of different graduation level than the input image.

2. The image processing apparatus according to claim 1, wherein the filter processing unit performs filter processing using a filter strength defined based on a gradation of the input image and a gradation of an image to be output.

3. The image processing apparatus according to claim 1, wherein the value limit calculation unit calculates a upper range value and a lower range value by performing a statistical analysis, the statistical analysis using a statistical population that includes at least one of the pixel values obtained as a result of the processing by the filter processing unit.

4. The image processing apparatus according to claim 3, wherein the analysis processing is performed using at least one of an average value, median value, maximal value, and a minimum value in target pixels.

5. The image processing apparatus according to claim 1, wherein, by operation of the limitation unit, at least one pixel value exceeding the range of the pixel values calculated by the value limit calculation unit is replaced by one of the value limits.

6. The image processing apparatus according to claim 1, wherein the conversion unit includes a linear transformation unit configured to perform linear transformation of the image having pixel values limited by the limitation unit, and includes a normalization unit configured to normalize the linear-transformed image.

7. The image processing apparatus according to claim 6, wherein the linear transformation unit performs linear transformation base on at least one of the value limits calculated the value limit calculation unit.

8. The image processing apparatus according to claim 1, further comprising:
a first storing unit configured to store the image converted by the conversion unit; and
a first motion vector calculation unit configured to calculate a motion vector based on images stored in the first storing unit.

9. The image processing apparatus according to claim 1, further comprising:
an image characteristic detection unit configured to detect a feature of an image based on the input image; and
a parameter storing unit configured to store the value limits calculated by the value limit calculation unit if the feature of the image is detected,
wherein the limitation unit calculates limited pixel values using the values stored in the parameter storing unit if the feature of the image is not detected.

10. The image processing apparatus according to claim 9, wherein the image characteristic detection unit detects a scene change.

11. A method comprising:
performing filter processing that emphasizes high-frequency components of an input image;
calculating value limits that define a range of pixel values for converting a gradation of the image using a result of the filter processing;
limiting the filter-processed pixel values based on the value limits; and
converting the pixel values so that the image having limited pixel values is adjusted to a converted gradation of different graduation level than the input image.

12. A non-transitory computer-readable storage medium that stores a program for instructing a computer to implement the method described in claim 11.

* * * * *